United States Patent

Shieh

[11] Patent Number: 5,916,279
[45] Date of Patent: Jun. 29, 1999

[54] MOTORCYCLE DISK BRAKE LOCK

[76] Inventor: Jin-Ren Shieh, No. 178, Shih Chia Rd., Taichung, Taiwan

[21] Appl. No.: 08/989,004

[22] Filed: Dec. 11, 1997

[51] Int. Cl.⁶ .................................................. E05B 67/36
[52] U.S. Cl. .................................. 70/33; 70/233; 70/386
[58] Field of Search .................................. 70/32–34, 386, 70/233

[56] References Cited

U.S. PATENT DOCUMENTS

| | | | |
|---|---|---|---|
| 4,063,434 | 12/1977 | Moberg | 70/34 |
| 4,394,820 | 7/1983 | Swisher | 70/34 |
| 4,426,860 | 1/1984 | Swisher | 70/34 |
| 4,712,395 | 12/1987 | Agbay | 70/34 |
| 4,840,049 | 6/1989 | Russo | 70/34 |
| 5,027,624 | 7/1991 | Agbay et al. | 70/34 |
| 5,379,618 | 1/1995 | Shieh | 70/33 |
| 5,492,206 | 2/1996 | Shieh | 70/33 X |
| 5,515,947 | 5/1996 | Shieh | 70/32 X |
| 5,517,837 | 5/1996 | Wang | 70/33 X |
| 5,542,273 | 8/1996 | Bednarz | 70/34 |
| 5,664,445 | 9/1997 | Chang | 70/34 |

FOREIGN PATENT DOCUMENTS

| | | | |
|---|---|---|---|
| 2810756 | 9/1978 | Germany | 70/33 |
| 455873 | 3/1950 | Italy | 70/33 |

*Primary Examiner*—Suzanne Dino Barrett
*Attorney, Agent, or Firm*—Browdy and Neimark

[57] ABSTRACT

A motorcycle disk brake lock is composed of a main body, a lock core, a lock bolt, a retrieving spring, and a lock bolt spring. The main body is provided with a disk receiving slot which is in turn provided with a receiving hole and an insertion slot. The lock core is received in the receiving hole. The lock bolt is composed of an inner lock bolt and an outer lock bolt which is provided with a plurality of retaining members for retaining and locating the main body and the lock bolt such that the disk brake lock can not be easily tampered with. The retrieving spring serves to locate the lock core at the unlocking position, whereas the lock bolt spring is intended to locate the inner lock bolt at the releasing position.

8 Claims, 4 Drawing Sheets

MOTORCYCLE DISK BRAKE LOCK

FIELD OF THE INVENTION

The present invention relates generally to a motorcycle disk brake, and more particularly to a lock capable of disabling the motorcycle disk brake to prevent the theft of the motorcycle.

BACKGROUND OF THE INVENTION

The conventional motorcycle disk brake lock is generally composed of a body which is provided with a slot to accommodate the disk of the disk brake. The body is U-shaped in its cross section and is provided respectively in two sides of the slot thereof with a receiving hole for disposing the lock core and the lock bolt, and with an insertion slot for receiving the end of the lock bolt. The receiving hole is provided therein with a position recovering spring for providing the force capable of keeping the lock core and the lock bolt at the unlocking position. In operation, the lock core and the lock bolt are located at the unlocking position such that the lock core juts out of the body. In operation, the disk brake of a motorcycle is received in the slot of the lock body before the lock core is pressed into the lock body such that the lock bolt is inserted into the insertion slot via one of the cooling holes of the disk brake. The motorcycle disk brake is thus locked.

Such a conventional motorcycle disk brake lock as described above is defective in design in that the lock body can be easily tampered with by inserting a foreign object into the slot of the U-shaped lock body. In order to overcome the drawback of the conventional motorcycle disk brake lock, the present invention an improved lock body which has an insertion slot provided with a retaining portion. In the meantime, the lock bolt is also improved such that the engaging end of the lock bolt is provided with a retaining portion engageable with the retaining portion of the insertion slot of the lock body at such time when the lock bolt is turned an angle of 90 degrees by means of the lock core. However, such an improvement as described above is limited in design in that a key is needed to lock the lock, thereby making it inconvenient to use, especially for an absent-minded person who has a propensity to forget to carry the key with him or her.

SUMMARY OF THE INVENTION

The primary objective of the present invention is to provide a tamperproof lock for disabling a motorcycle disk brake.

It is another objective of the present invention to provide a motorcycle disk brake lock with a locking mechanism which works without the use of a key.

In keeping with the principle of the present invention, the foregoing objectives of the present invention are attained by a lock consisting of a main body, a lock core, a lock bolt, a retrieving spring, and a lock bolt spring. The main body is provided with a disk receiving slot which is provided respectively in both sides thereof with a receiving hole and an insertion slot. The lock core is located in the receiving hole. The lock bolt is composed of an inner lock bolt and an outer lock bolt, which are movably located in the receiving hole. The outer lock bolt is provided with a predetermined number of retaining members. The main body and the lock bolt are retained and located securely by the retaining members capable of being retained in the cavities of the insertion slot. The main body and the lock bolt can not be therefore tampered with. The retrieving spring is intended to provide the lock core with an elastic force when the lock core is located at the unlocking position, whereas the lock bolt spring is intended to provide the inner lock bolt with an elastic force when the inner lock bolt is kept at the releasing position.

DETAILED DESCRIPTION OF THE INVENTION

Figure 1:
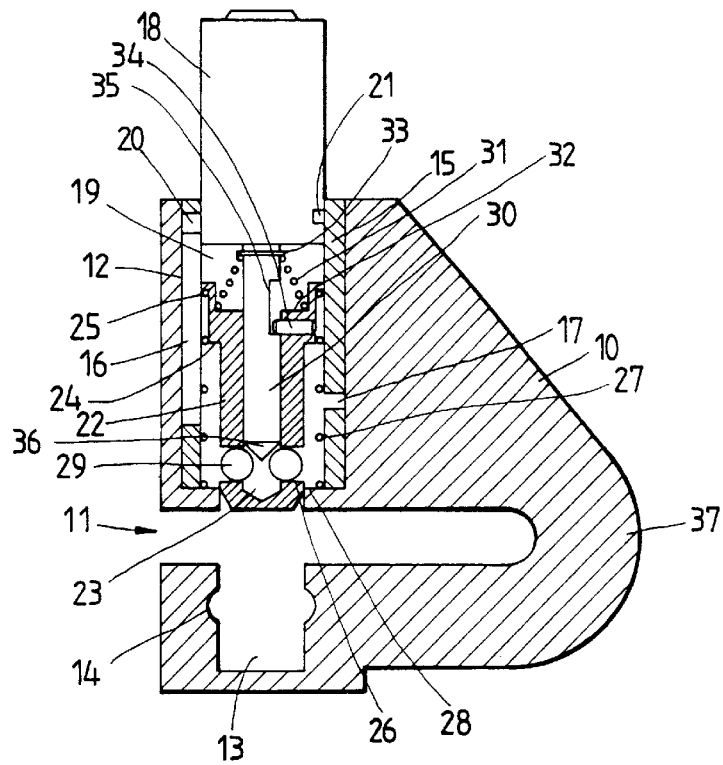
FIG. 1 shows a schematic view of a first preferred embodiment of the present invention in an unlocking state.
Figure 2:
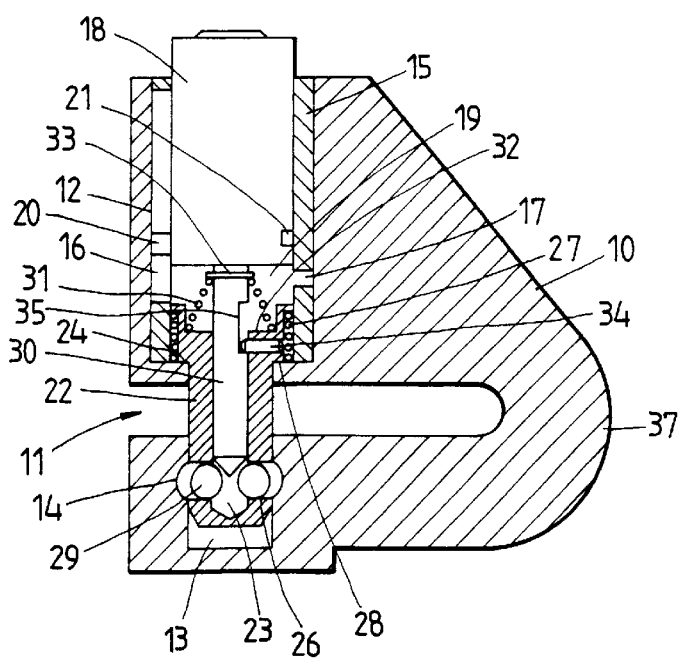
FIG. 2 shows a schematic view of the first preferred embodiment of the present invention at work.
Figure 3:
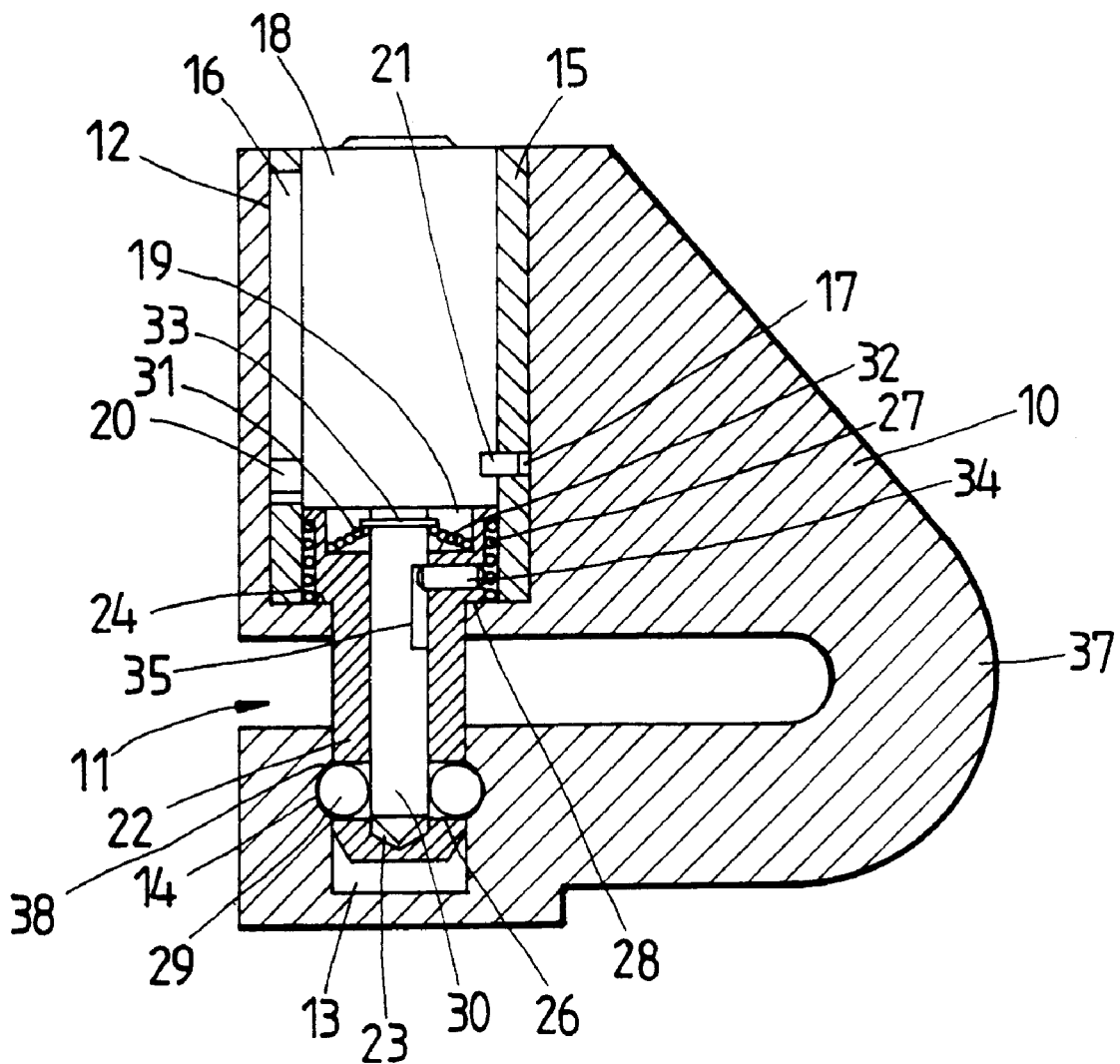
FIG. 3 shows a schematic view of the first preferred embodiment of the present invention in a locking state.

As shown in FIGS. 1–3, a motorcycle disk brake lock of the first preferred embodiment of the present invention is composed of the component parts, which are described hereinafter.

A main body 10 is provided with a slot 11 for receiving the disk of a motorcycle disk brake. The slot 11 is provided in one side thereof with a receiving hole 12, and in another side thereof with an insertion slot 13 which is in turn provided in the inner wall thereof with at least one or more cavities 14.

A sleeve 15 is received in the receiving hole 12 and is provided with a guide slot 16 and a locating hole 17.

A lock core 18 is received in an axial hole 19 of the sleeve 15 such that the lock core 18 is capable of displacing along the axial hole 19.

A locating pin 20 is fastened with the lock core 18 and is located in the guide slot 16 for confining the linear displacement of the lock core 18 to take place between an unlocking position (FIG. 1) and a locking position (FIG. 3).

A locating member 21 is located in the lock core 18 such that the locating member 21 juts out to locate in the locating hole 17 for locating and retaining the lock core 18 when the lock core 18 is moved to the locking position (FIG. 3). As the lock core 18 is rotated for a predetermined angle by means of a key (not shown in the drawing), the locating member 21 is retracted into the lock core 18 to free the lock core 18, which is subsequently able to return to the unlocking position.

An outer lock bolt 22 is provided with an axial hole 23. Located at one end of the outer lock bolt 22 are two round shoulders 24 and 25. Another end of the outer lock bolt 22 is provided with a predetermined number of through holes 26 corresponding in number to the cavities 14. The outer lock bolt 22 is received in the axial hole 19.

A retrieving spring 27 has one end urging the end wall 28 of the receiving hole 12 of the main body 10. The retrieving spring 27 has another end urging the round shoulder 25.

A retaining member 29 is corresponding in number to the through hole 26 of the outer lock bolt 22. The retaining member 29 is in fact a steel ball in the first preferred embodiment of the present invention. There are two steel balls 29, which are received in two through holes 26 such that the steel balls 29 are capable of displacing between a retaining position (FIG. 3) and a releasing position (FIG. 1). The retaining position juts out of the surface of the outer lock bolt 22, whereas the releasing position is retracted from the surface of the outer lock bolt 22.

An inner lock bolt 30 is located in the axial hole 23 of the outer lock bolt 22 such that the inner lock bolt 30 is capable of displacement relative to the outer lock bolt 22, and that the inner lock bolt 30 is able to displace between a retaining position (FIG. 3) and a releasing position (FIG. 1). The inner lock bolt 30 is provided with a guide slot 35 and is further provided at one end thereof with a retaining ring 33 and at another end thereof with a tapered end 36.

A lock bolt spring 31 has one end urging an inner end surface 32 of the outer lock bolt 22 and further has another end urging the retaining ring 33 of the inner lock bolt 30. The lock bolt spring 31 of the first preferred embodiment of the present invention has an elasticity coefficient greater than that of the retrieving spring 27.

An insertion pin 34 is engaged with the outer lock bolt 22 such that the pin 34 is extended into the guide slot 35 of the inner lock bolt 30 for guiding and confining the displacement of the inner lock bolt 30.

In operation, the lock is set at the unlocking position, as shown in FIG. 1, such that the outer lock bolt 22 is urged by the retrieving spring 27 to locate in the receiving hole 19 without jutting out into slot 11, and that the inner lock bolt 30 is urged by the lock bolt spring 31 to locate at the releasing position to push the lock core 18 to locate at the unlocking position. In the meantime, the locating member 21 is retracted into the lock core 18, whereas the two retaining members 29 are located at the releasing position.

As shown in FIG. 2, the lock is set at the locking position by pressing the lock core 18 into the main body 10 such that the inner lock bolt 30 is pushed by the lock core 18 to move toward the insertion slot 13. In view of the fact that the elasticity coefficient of the lock bolt spring 31 is greater than that of the retrieving spring 27, the outer lock bolt 22 is also urged to move into the insertion slot 13 such that the round surface 24 is stopped by the end wall 28. The retrieving spring 27 is compressed, whereas the through hole 26 is opposite to the cavity 14.

As illustrated in FIG. 3, the lock bolt spring 31 is compressed by the persistent force exerting on the lock core 18, the inner lock bolt 30 is pushed continuously to displace toward the insertion slot 13 so as to retract into the outer lock bolt 22 such that the retaining member 29 is pushed by the tapered end 36 to move into the cavity 14. In the meantime, the retaining member 29 is retained in the insertion slot 13 of the main body 10 while the locating member 21 is engaged with the locating hole 17 to keep the lock core 18 at the locking position. If a tool is inserted into the slot 1 1 to tamper with the main body 10, the resistant point is thus changed from the connection portion 37 to the end wall 38 of the cavity 14, thereby shortening the length of lever of force so as to enhance the safeguard of the lock against the sabotage.

In the process of unlocking the lock, a key (not shown in the drawings) is inserted into the lock core 18, which is then rotated by the key to cause the locating member 21 to withdraw from the locating hole 17. In the meantime, the inner lock bolt 30, the outer lock bolt 22, the retaining members 29, and the lock core 18 are forced by the forces released by the compressed springs 27 and 31 to return to their original unlocking positions as shown in FIG. 1.

Figure 4:
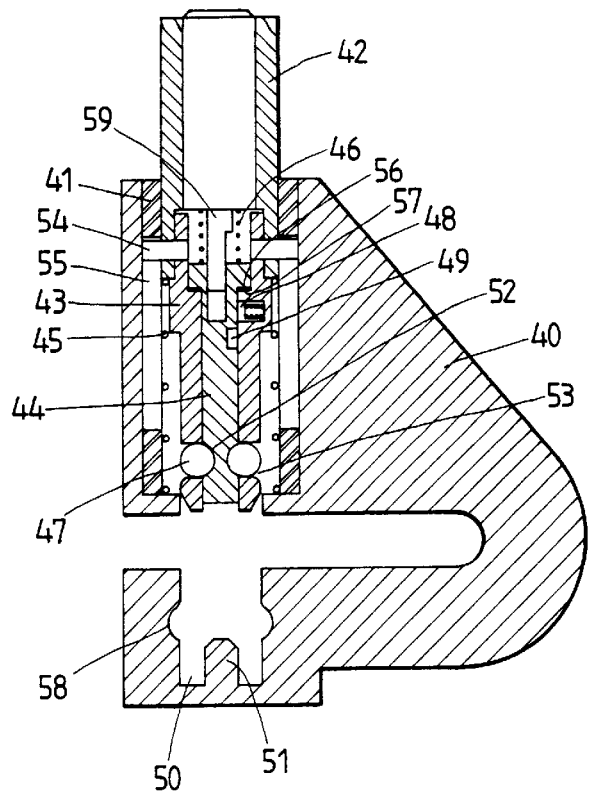
FIG. 4 shows a schematic view of a second preferred embodiment of the present invention in an unlocking state.
Figure 5:
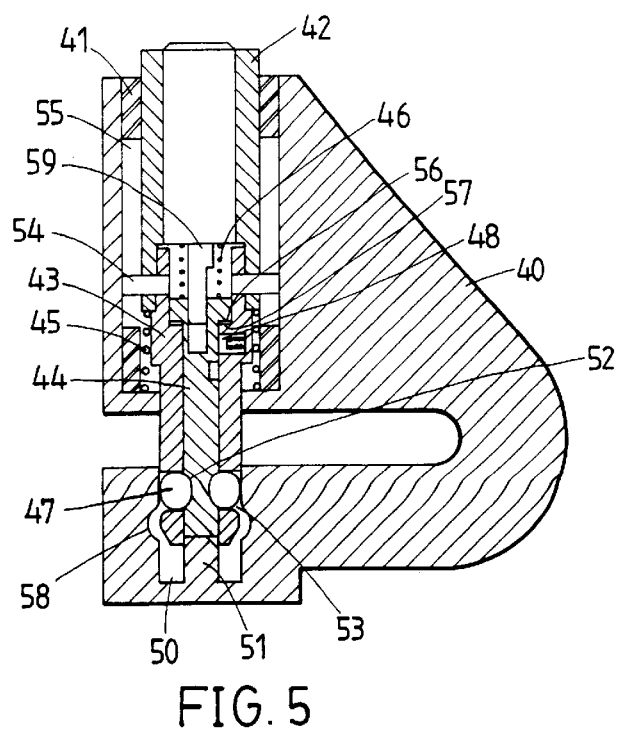
FIG. 5 shows a schematic view of the second preferred embodiment of the present invention at work.
Figure 6:
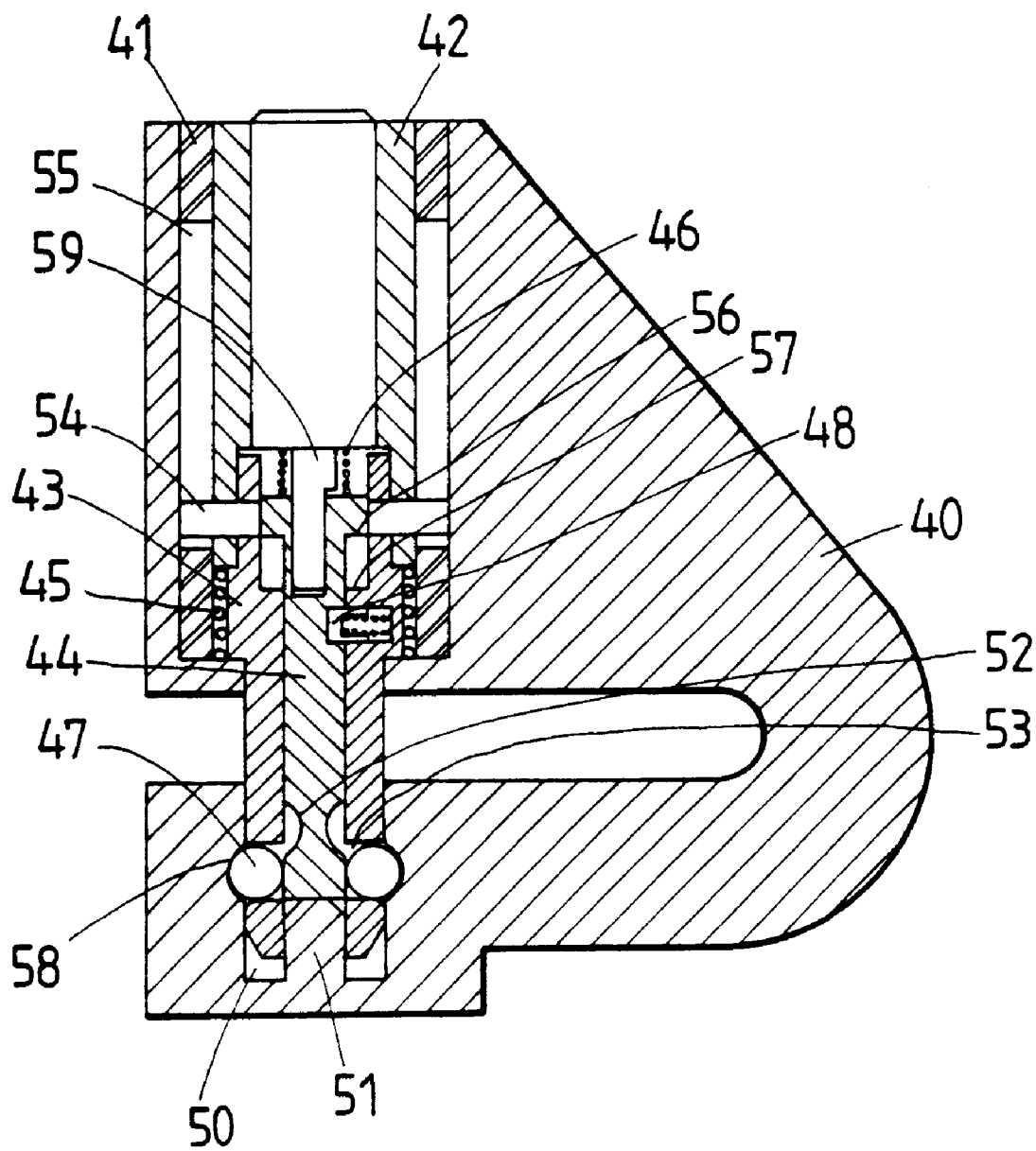
FIG. 6 shows a schematic view of the second preferred embodiment of the present invention in a locking state.

Now referring to FIGS. 4–6, a motorcycle disk brake lock of the second preferred embodiment of the present invention is composed of a main body 40, a sleeve 41, a lock core 42, an outer lock bolt 43, an inner lock bolt 44, a retrieving spring 45, a lock bolt spring 46, a predetermined number of retaining members 47, locating members 48 and locating holes 49.

The main body 40 is provided with an insertion slot 50 which is in turn provided in the bottom wall thereof with a projected column 51. The inner lock bolt 44 is provided with cavities 52 corresponding in location to the retaining members 47 which are located in the through holes 53 of the outer lock bolt 43 and the cavities 52 at the time when the disk brake lock is set at the unlocking position. The lock core 42 is urged by the retrieving spring 45 to remain at the unlocking position. The outer lock bolt 43 and the lock core 42 are held together by means of a locating pin 54. The lock core 42 is capable of making a linear displacement along the guide slot 55 of the sleeve 41. The inner lock bolt 44 is urged by the lock bolt spring 46 such that the shoulder face 56 of the inner lock bolt 44 is engaged with the shoulder face 57 of the outer lock bolt 43. From the unlocking position of FIG. 4 to the locking position of FIG. 6, the lock core 42 and the outer lock bolt 43 are moved toward the insertion slot 50 to compress the retrieving spring 45, as show in FIG. 5. When the inner lock bolt 44 is stopped by the projected column 51, the outer lock bolt 43 is continuously actuated by the lock core 42 to displace to force the retaining members 47 to move into the cavities 58. The lock bolt spring 46 is compressed by the inner lock bolt 44. The locating member 48 is retained in the locating hole 49. As a result, the lock core 42 is kept at the locking position. In the process of unlocking the disk brake lock, a key (not shown in the drawing) is inserted into the lock core 42. The center 59 of the lock core 42 is rotated by the key such that the inner lock bolt 44 is actuated to turn a predetermined angle to force the locating member 48 to become disengaged. The lock core 42 is then forced by the springs 45 and 46 to return to its original unlocking position as shown in FIG. 4.

The first preferred embodiment and the second preferred embodiment are similar in mechanism, with the difference being that the outer lock bolt of the former is first located before the inner lock bolt is displaced to force the retaining members to displace so as to engage the cavities of the insertion slot of the main body, and that the inner lock bolt of the latter is first located before the outer lock bolt is displaced to force the retaining members to displace so as to engage the cavities of the insertion slot of the main body.

What is claimed is:

1. A motorcycle disk brake lock comprising:

a main body provided with a disk slot for accommodating the disk of a motorcycle disk brake, said disk slot provided with a receiving hole and an insertion slot;

a lock core located in said receiving hole such that said lock core is capable of displacing between a released position and a locked position;

a lock bolt located in said receiving hole such that said lock bolt is capable of displacing along with said lock core; and a retrieving spring located in said receiving hole for returning and keeping said lock core at the released position;

wherein said insertion slot is provided in an inner wall thereof with at least one cavity;

wherein said lock bolt comprises:

an outer lock bolt provided with an axial hole, a through hole in communication with said axial hole, retaining means located in said through hole for displaceable engagement between said outer lock bolt and said cavity of said inner wall when said through hole corresponds in location to said cavity; and an inner lock bolt located in said axial hole of said outer lock bolt such that said inner lock bolt is capable of sliding between a locked position and a released position, and that when said inner lock bolt and said outer lock bolt are slid over said disk slot, said inner lock bolt, is capable of pushing said retaining means into the locked position;

a lock bolt spring for providing a force for returning and keeping said inner lock bolt to the released position;

wherein said disk slot is open when said inner lock bolt and said outer lock bolt are returned to the released position.

2. The lock as defined in claim 1, wherein said lock bolt spring has one end urging said outer lock bolt, and another end urging said inner lock bolt; wherein said inner lock bolt is pushed by said lock core from the released position to the locked position when said lock core is displaced from the released position to the locked position; and wherein said retaining means is pushed by said inner lock bolt to engage said cavity when said lock core is displaced from the released position to the locked position.

3. The lock as defined in claim 1, wherein said lock core has a locating member; and wherein said receiving hole is provided in a wall thereof with a locating hole engageable with said locating member at such time when said lock core is displaced from the released position to the locked position.

4. The lock as defined in claim 3, wherein said lock core, said inner lock bolt, said outer lock bolt, said retrieving spring, and said lock bolt spring are received in a sleeve which is located in said receiving hole of said main body and is provided with a guide slot for guiding said lock core to displace linearly.

5. The lock as defined in claim 1, wherein said insertion slot is provided in a bottom wall thereof with a projected column; wherein said outer lock bolt and said lock core are held together by a pin; wherein said lock bolt spring has one end urging said lock core and another end urging said inner lock bolt to locate said inner lock bolt at the released position; said retrieving spring has one end urging said lock core and another end urging a wall of said receiving hole of said main body for locating said lock core at the released position; and wherein said inner lock bolt is stopped by said projected column of said insertion slot at such time when said lock core is displaced from the released position to the locked position, thereby causing said inner lock bolt to force said retaining means to displace from the released position to the locked position.

6. The lock as defined in claim 5, wherein said outer lock bolt has a locating member; and wherein said inner lock bolt has a locating hole engageable with said locating member of said outer lock bolt at such time when said lock core is displaced from the released position to the locked position.

7. The lock as defined in claim 1, wherein the coefficient of elasticity of the lock bolt spring is greater than that of the retrieving spring.

8. The lock as defined in claim 7, wherein the lock bolt spring and the retrieving spring are coaxial.

\* \* \* \* \*